United States Patent
Jones et al.

(10) Patent No.: US 10,301,021 B2
(45) Date of Patent: May 28, 2019

(54) PACKAGE RELEASE SYSTEM FOR USE IN DELIVERY PACKAGES, AND METHODS OF DELIVERING PACKAGES

(71) Applicant: Walmart Apollo, LLC, Bentonville, AR (US)

(72) Inventors: Nathan G. Jones, Bentonville, AR (US); Gregory A. Hicks, Rogers, AR (US); Donald R. High, Noel, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 290 days.

(21) Appl. No.: 15/271,801

(22) Filed: Sep. 21, 2016

(65) Prior Publication Data
US 2017/0081029 A1  Mar. 23, 2017

Related U.S. Application Data (60) Provisional application No. 62/222,575, filed on Sep. 23, 2015.

(51) Int. Cl.
 *B64C 39/02* (2006.01)
(52) U.S. Cl.
 CPC ...... *B64C 39/024* (2013.01); *B64C 2201/027* (2013.01); *B64C 2201/108* (2013.01); *B64C 2201/128* (2013.01)
(58) Field of Classification Search
 CPC ............ B64C 39/024; B64C 2201/027; B64C 2201/108; B64C 2201/128; B66C 1/38; B66C 1/66
(Continued)

(56) References Cited

U.S. PATENT DOCUMENTS

| 2,928,693 A | * | 3/1960 | Cannon, Jr. ............... F41F 5/04 |
| | | | 279/100 |
| 3,009,729 A | * | 11/1961 | Eakin ....................... B64D 1/04 |
| | | | 102/390 |

(Continued)

FOREIGN PATENT DOCUMENTS

CN    204415731    1/2015

OTHER PUBLICATIONS

Colgan, Paul; "Domino's CEO Don Meij: In the future, kids will wonder what it was like driving when you could've killed someone"; http://www.businessinsider.com.au/dominos-ceo-don-meij-tech-100-drones-2016-10;Oct. 24, 2016, pp. 1.
(Continued)

*Primary Examiner* — Timothy D Collins
*Assistant Examiner* — Tye William Abell
(74) *Attorney, Agent, or Firm* — Fitch, Even, Tabin & Flannery LLP (57) ABSTRACT

In some embodiments, systems, apparatuses and methods are provided to enhance delivery of packages and/or cargo through the use of unmanned delivery aircraft. In some embodiments, a mechanical package release system is provided that comprises: a package release hanger configured to couple with and suspend from an unmanned delivery aircraft; and one or more tension supports each configured to secure with a package and to releasably couple with the package release hanger wherein a decrease of at least a threshold amount of a force being applied by the weight of the package on the one or more tension supports induces a mechanical release of the coupling between the one or more tension supports and the package release hanger resulting in a release of the package from the unmanned delivery aircraft.

14 Claims, 5 Drawing Sheets

(58) Field of Classification Search
USPC .............. 294/27.1, 68.21, 82.28, 82.24, 75
See application file for complete search history.

(56) References Cited

U.S. PATENT DOCUMENTS

| | | | | |
|---|---|---|---|---|
| 4,358,144 | A * | 11/1982 | Schmidt | B66C 1/66 |
| | | | | 294/110.1 |
| 5,161,705 | A * | 11/1992 | Takai | B66C 1/12 |
| | | | | 212/271 |
| 8,162,263 | B2 | 4/2012 | Wong | |
| 9,205,922 | B1 * | 12/2015 | Bouwer | B64D 9/00 |
| 9,302,770 | B2 | 4/2016 | Burgess | |
| 9,550,577 | B1 | 1/2017 | Beckman | |
| 9,573,684 | B2 | 2/2017 | Kimchi | |
| 9,650,136 | B1 * | 5/2017 | Haskin | B64D 1/12 |
| 2009/0146011 | A1 * | 6/2009 | Ritter | B64G 1/646 |
| | | | | 244/172.4 |
| 2013/0240673 | A1 * | 9/2013 | Schlosser | G05D 1/101 |
| | | | | 244/137.1 |
| 2013/0259634 | A1 * | 10/2013 | Raz | B64D 1/12 |
| | | | | 414/801 |
| 2015/0120094 | A1 | 4/2015 | Kimchi | |
| 2015/0158587 | A1 | 6/2015 | Patrick | |
| 2015/0277440 | A1 | 10/2015 | Kimchi | |
| 2016/0059963 | A1 * | 3/2016 | Burgess | B64D 1/12 |
| | | | | 701/49 |
| 2016/0196755 | A1 | 7/2016 | Navot | |
| 2016/0257401 | A1 | 9/2016 | Buchmueller | |
| 2017/0029104 | A1 * | 2/2017 | Kim | B64C 39/02 |
| 2017/0110017 | A1 | 4/2017 | Kimchi | |
| 2017/0247109 | A1 * | 8/2017 | Buchmueller | B64D 1/12 |
| 2018/0072419 | A1 * | 3/2018 | Burgess | B64D 1/12 |

OTHER PUBLICATIONS

PCT; App. No. PCT/US2016/052830; International Search Report and Witten Opinon dated Dec. 16, 2016.
Zowzow; "Drone playload drop system"; http://www.instructables.com/id/Drone-Playload-Drop-System/?ALLSTEPS;Sep. 10, 2016; pp. 1-5.
Russon, Mary-Ann; "Pie in the Sky : How Russian Firm DoDo Pizza Delivers Takeaways by Drone"; http://www.ibtimes.co.uk/dronedeliveryrussiasairbornepizzasareheightfinedining1454684; Jun. 30, 2014; pp. 1-4.
Killion, Beth; "Viedo of the Day May 29, 2015: DIY Drone Delivery"; http://dronelife.com/2015/05/29/videooftheday52915diydronedelivery/; May 29, 2015.
Madrigal, Alexis C.; "The Atlantic—Inside Google's Secret Drone-Delivery Program"; http://www.theatlantic.com/technology/archive/2014/08/insidegooglessecretdronedeliveryprogram/; Aug. 28, 2014; pp. 1-25.
"Drone beer delivery"; http://hoogtezicht.nl/author/redactie; Feb. 15, 2014; pp. 1-9.
The Virtual Philosophy Club: Amazon Prime Air, DHL, UPS Drone Delivery Concepts; "Amazon Prime Air, DHL, UPS Drone Delivery Concepts"; http://tvpclub.blogspot.in/2014/10/amazonprimeairdhlupsdronedelivery.html; Oct. 8, 2014; pp. 1-11.

* cited by examiner

PACKAGE RELEASE SYSTEM FOR USE IN DELIVERY PACKAGES, AND METHODS OF DELIVERING PACKAGES

CROSS-REFERENCE TO RELATED APPLICATION

This application claims the benefit of U.S. Provisional Application No. 62/222,575, filed Sep. 23, 2015, which is incorporated herein by reference in its entirety.

TECHNICAL FIELD

This invention relates generally to delivery packages and/or cargo.

BACKGROUND

In a modern retail environment, there is a need to improve the customer service and/or convenience for the customer. One aspect of customer service is the delivery of products. There are numerous ways to delivery products to customers. Getting the product to a delivery location, however, can cause undesirable delays, add cost and reduce revenue.

BRIEF DESCRIPTION OF THE DRAWINGS

Disclosed herein are embodiments of systems, apparatuses and methods pertaining to the release of packages and/or cargo during the delivery of the packages and/or cargo. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to cooperate a package and/or cargo with an unmanned delivery aircraft for delivery to a customer. The delivery includes depositing the package at a delivery site with an automated release of the package from the delivery vehicle. Further, the automated release of the package can be achieved through strictly mechanical operations. Some implementations provide a package release hanger configured to couple with and suspend from an unmanned delivery aircraft. One or more tension supports can each secure with a package and further releasably couple with the package release hanger such that when a decrease of at least a threshold amount of a force being applied by the weight of the package on the tension supports induces a mechanical release of the coupling between the tension supports and the package release hanger resulting in a release of the package from the unmanned delivery aircraft.

Figure 1:
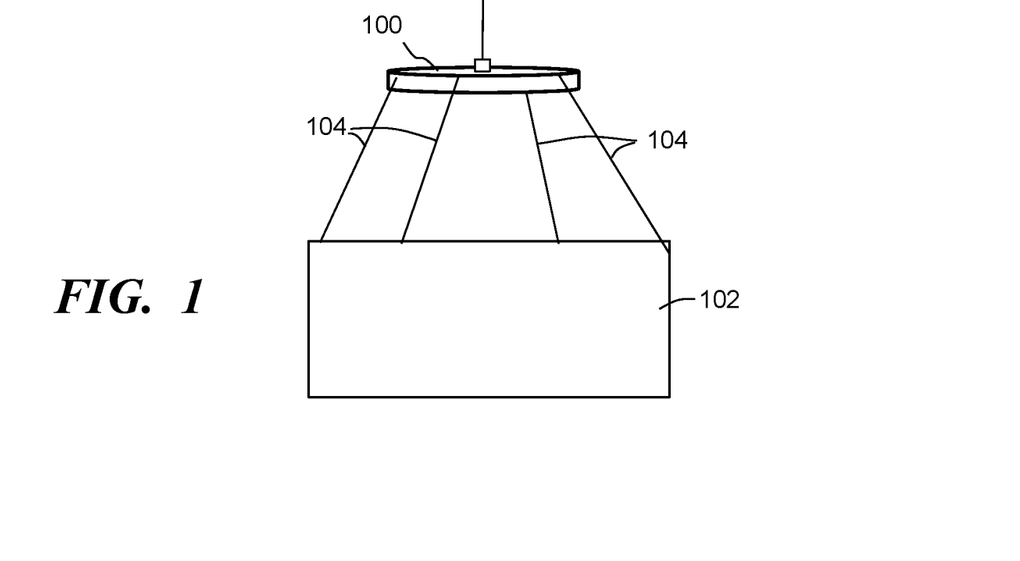
FIG. 1 illustrates a simplified plane view of an exemplary package release system that includes a package release hanger, in accordance with some embodiments.

FIG. 1 illustrates a simplified plane view of an exemplary package release system that includes a package release hanger 100, in accordance with some embodiments. One or more tension supports 104 are releasably cooperated with the package release hanger 100 and extend away from the package release hanger to be secured with the package 102, or couplers that extend from the package. In some implementations, the package release hanger 100 is configured to couple with and suspend from an unmanned delivery aircraft, and enable a rapid release of a package at a delivery location. The release of the package from the delivery aircraft can allow, as one example, the delivery aircraft to deliver the product without having to land, and in some applications delivery the package without having to descend below a threshold height above a delivery surface. Further, in some embodiments the release of the package is achieved without electronic signaling, and instead is achieved strictly through mechanical actions.

Figure 2:
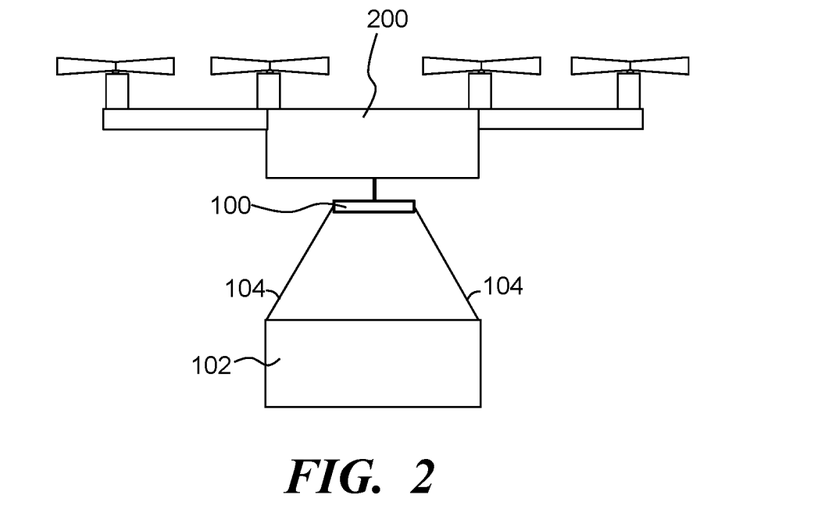
FIG. 2 illustrates a simplified plane view of an exemplary unmanned delivery aircraft with a package release system cooperated with the delivery aircraft, in accordance with some embodiments.

FIG. 2 illustrates a simplified plane view of an exemplary unmanned delivery aircraft 200 with a package release system cooperated with the delivery aircraft, in accordance with some embodiments. The package release system, at least in part, includes with a package release hanger 100 suspended from the delivery aircraft by a cord 202, cable, rope or the like, and tension supports releasably cooperated with the package release system. A package 102 is releasably cooperated with the package release hanger and suspended from the package release hanger by the tension supports 104. In some implementations, the cord can be spooled out, for example from a crane system, to lower the package to a delivery site while the delivery aircraft 200 hovers over the delivery site. The quick release aspect of the package release hanger allows the package to be disengaged from the delivery aircraft at the delivery site without the delivery aircraft having to land. In some instances, the package may be lowered 5, 20, 40 feet or more depending on an implementation allowing the delivery aircraft to avoid having to descend into and/or land in areas where it may accidently contact structures, trees, or potentially harm people and/or pets. Typically, the package release hanger is made from a relatively light weight material with dimensions appropriate to support expected weights of packages to be delivered by the unmanned delivery aircraft system. For example, the package release hanger may be made from plastic, reinforced carbon polymer, aluminum, or other such relatively light weight material or combination of two or more of such materials. In some implementations the package release hanger is formed through an injection molded plastic.

Figure 3:
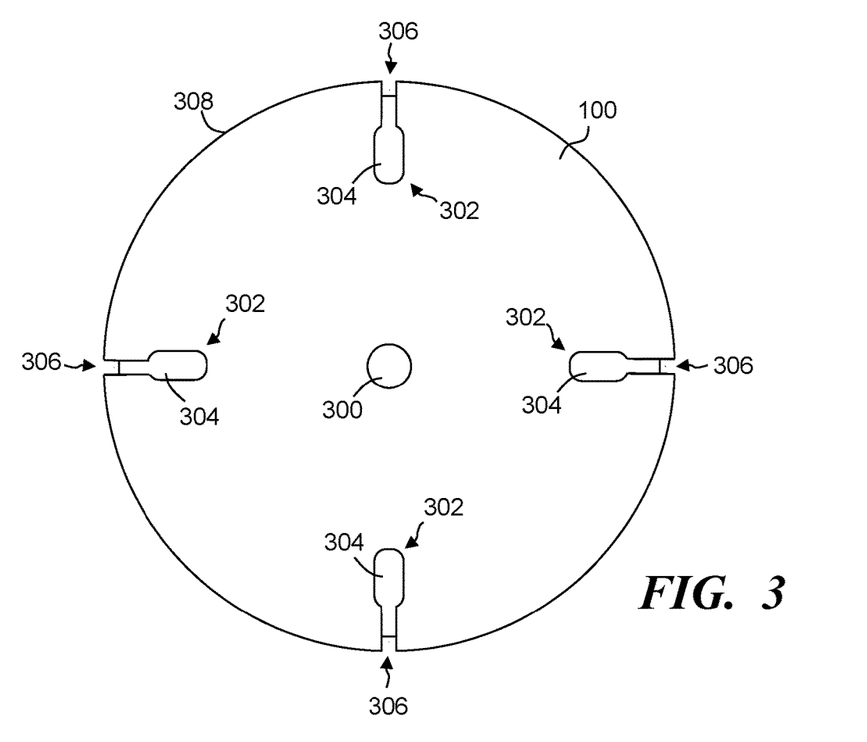
FIG. 3 illustrates a simplified overhead plane view of an exemplary package release hanger, in accordance with some embodiments.
Figure 4:
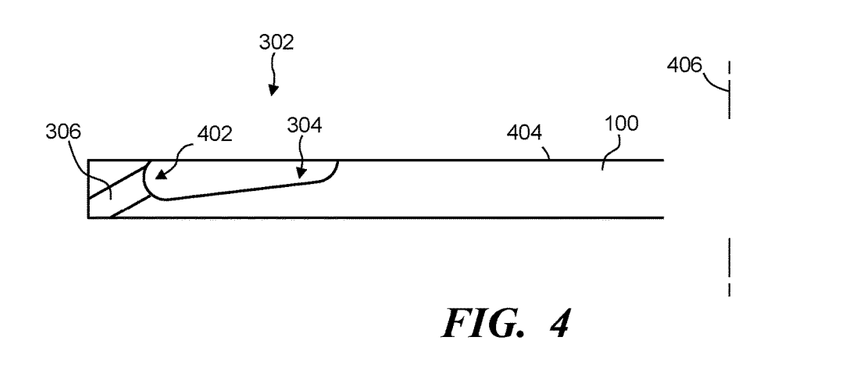
FIG. 4 illustrates a simplified cross-sectional view of a portion of the package release hanger of FIG. 3, in accordance with some embodiments.
Figure 5:
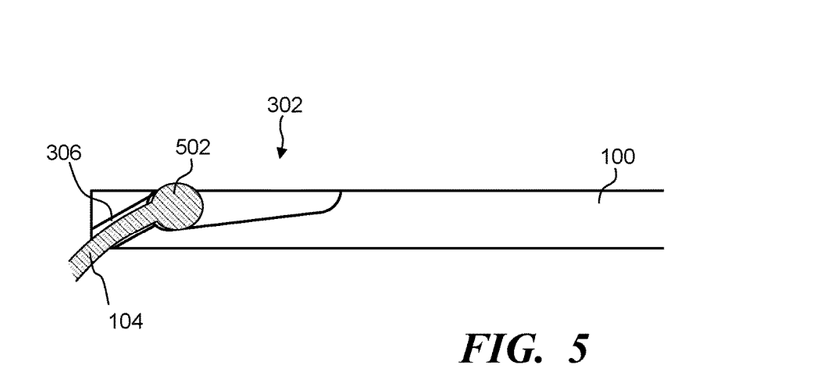
FIG. 5 illustrates the simplified cross-sectional view of the portion of the package release hanger of FIG. 4 with a tension support cooperated with the package release hanger, in accordance with some embodiments.

FIG. 3 illustrates a simplified overhead plane view of an exemplary package release hanger 100, in accordance with some embodiments. FIG. 4 illustrates a simplified cross-sectional view of a portion of the package release hanger 100 of FIG. 3, in accordance with some embodiments. FIG. 5 illustrates the simplified cross-sectional view of the portion of the package release hanger 100 of FIG. 4 with a tension support 104 cooperated with the package release hanger, in accordance with some embodiments. The package release hanger 100 includes one or more suspension links 300 that are configured to secure the package release hanger with the unmanned delivery aircraft 200. The suspension link can be substantially any relevant structure that allows the cord 202 (rope, cable, etc.) to be secured with the package release hanger. For example, the suspension link can include an aperture allowing the cord to pass through the aperture and be secured on a bottom side of the package release hanger. In other implementations, the suspension link may be an eye bolt, a cable clamp, other such devices, or combination of such devices.

The package release hanger 100 further includes one or more receiving slots 302 distributed about the package release hanger. In some applications, multiple receiving slots are formed in and/or on the package release hanger, and equally spaced around and positioned proximate the edges of the package release hanger. Typically, the receiving slots 302 are formed in a surface 404 of the package release hanger that is positioned, when in use to support a package, facing away from the package (sometimes referred to as an upper or top surface). The receiving slots are configured to receive and temporarily retain a portion of the tension support 104. For example, in some implementations the tension support includes at least one slot coupler 502 that at least partially fits into a receiving slot 302. The receiving slots 302 include an insert opening 304 and a coupler seat 402. In some applications, the insert opening 304 extends into the coupler seat 402 providing a continue slot. In some embodiments, the coupler seat is positioned at end of the receiving slot that is closest to a peripheral edge 308 of the package release hanger.

The receiving slot is configured to receive slot coupler 502 of the tension support with the slot coupler 502 at least partially fitting into the coupler seat 402 and mating with one of the receiving slot. Again, the tension supports are further configured to extend from the package release hanger and cooperate with the package 102. As such, when the package is suspended the weight of the package applies a force on the tension support that in turn causes the slot coupler 502 to apply a force on the coupler seat 402. In some applications, receiving slot 302 is positioned relative to a peripheral edge 308 of the package release hanger, and often separated by a distance from the peripheral edge, so that the slot coupler 502 fits with the seat coupler and applies a radial outward force on the coupler seat 402 of the receiving slot 302. This radial force at least in part helps to maintain a positioning of the slot coupler within the receiving slot.

In some implementations, the package release hanger 100 further includes tension support channels 306 that extend from each of the receiving slots 302. The multiple tension support channels 306 each cooperate with one of the receiving slots and extend from the receiving slot toward the peripheral edge 308 of the package release hanger. In some implementations, the tension support channels extend from the corresponding receiving slot at an angle relative to a central axis 406 of the package release hanger and/or a plane defined by an upper surface 404. When the tension support 104 is cooperated with the receiving slot, a portion of the respective tension support is positioned within the tension support channel 306 while the slot coupler 502 is maintained within the receiving slot. The angled tension support channel in part further enhances the radially outward force applied by the slot coupler against the coupler seat 402. In other implementations the angle of the tension support channel may be changed and/or a tension support channel may not be associated with a slot, which may depend on the type of tension release, weight of the package, other such factors, or combination of such factors. Similarly, in some applications, the receiving slot 302 is formed from an angled slot that increases in depth closer to the peripheral edge 308. In other implementations, however, the receiving slot may have a substantially constant depth.

The coupler seat 402 is configured to mate with the slot coupler 502 and help to maintain the slot coupler within the slot until the package 102 is to be released. In some embodiments the coupler seats are formed to be consistent with a shape of the slot coupler 502. Additionally or alternatively, the coupler seats are formed such that the cooperation between the slot couplers 502 and the coupler seats 402 allow the slot couplers to move, rotate and/or swivel within the coupler seat. This movement can help to maintain the slot coupler within the receiving slot. For example, during delivery winds, movement of the delivery aircraft and turbulence may cause the package 102 to swing relative to at least the delivery aircraft and often relative to the package release hanger 100. Accordingly, by configuring the coupler seat 402 to allow the slot coupler 502 a range of motion to at least in part compensate for movement of the package relative to the package release hanger. In some embodiments, for example, the slot coupler 502 is formed as generally spherical, and the coupler seat 402 can similarly be formed with a generally spherical shape that establishes effectively a ball and socket joint and allows at least some swivel and/or rotational movement of the slot coupler relative to the package release hanger, and reduces unintended disengagement of one or more tension supports from the package release hanger. In other embodiments, for example, the slot coupler may be generally cylindrical with a similarly cylindrically shaped coupler seat, a slot coupler may have a triangular cross-section with an edge pressing against a flat or circularly shaped coupler seat, or other such configurations that provide swiveling and/or rotational movement between the coupler seat 402 and the slot coupler 502.

The amount of movement provided between the coupler seat and the slot coupler can vary depending on one or more factors, such as but not limited to size of the coupler seat 402 relative to the slot coupler 502, depth of the slot, dimensions of the tension support channel relative to dimensions of the portion of the tension support within the tension support channel, weight of the package, and other such factors. Some embodiments may further enhance the movement between the slot coupler 502 and the coupler seat 402 through the use of reduced friction materials, such as coating one or both with a Teflon™, some kinds of plastics and the like, using a lubricant, and/or other such features.

In some implementations, the slot coupler 502 has dimensions greater than at least a depth of the slot and/or the coupler seat 402. As such, a portion of the slot coupler 502 may extend above and out of the slot. This may enhance the ability of the tension support to be mechanically released from the package release hanger. In other embodiments, the slot coupler fully fits within the coupler seat and/or slot, which may enhance stability and reduce unintentional releases of packages. One or more factors typically can affect the type and/or size of the package release hanger and/or tension supports that are used. For example, weather conditions (e.g., winds in excess of thresholds), package sizes, package weight, stability of delivery aircraft, and other such factors, or typically a combination of two or more of such factors can affect a selection of a package release hanger, type of slot and/or coupler seat, slot coupler, and/or tension support.

As described above, the one or more tension supports 104 are each configured to secure with a package 102 and to releasably couple with the package release hanger 100 such that a decrease of at least a threshold amount of a force being applied by the weight of the package on the one or more tension supports induces a mechanical release of the coupling between the one or more tension supports and the package release hanger resulting in a release of the package from the unmanned delivery aircraft 200. In some embodiments, one or more of the tension supports 104 are further configured to enhance the separation and/or release of the tension supports from the package release hanger 100. In some applications, each of the one or more tension supports is configured to push the corresponding slot coupler 502 at least partially radially inward and out of the corresponding slot coupler 502 and receiving slot 302 in response to a decrease of at least the threshold amount of the force to mechanically release the coupling between the package and package release hanger. The decrease of the threshold amount of force typically results in response to the package 102 contacting a delivery surface at a delivery site such that the weight supported by the tension supports is reduced. When the delivery surface is supporting a threshold amount of weight corresponding to the reduction in the decrease of the threshold force, the slot couplers are released and/or are pushed out of the receiving slots and separating the package from the package release hanger 100 and unmanned delivery aircraft 200.

In some embodiments one or more of the tension supports 104 comprise an elastic rod that extends along at least a majority of a length of each of the tension supports. The elastic rods are configured to push the corresponding slot coupler 502 out of the corresponding receiving slot 302 in response to the decrease of at least the threshold amount of force. Further, in some implementations, the tension supports are formed from an elastic rod extending substantially an entire length of the suspension support. Additionally, the elastic rod of each of the tension supports, when cooperated with a package 102 and a receiving slot 302, elastically bends in response to the force due to the weight of the package. This bending at least in part causes at least some of the radial outward force asserted by the slot coupler 502 on the corresponding coupler seat 402 of the receiving slot 302.

Figure 6:
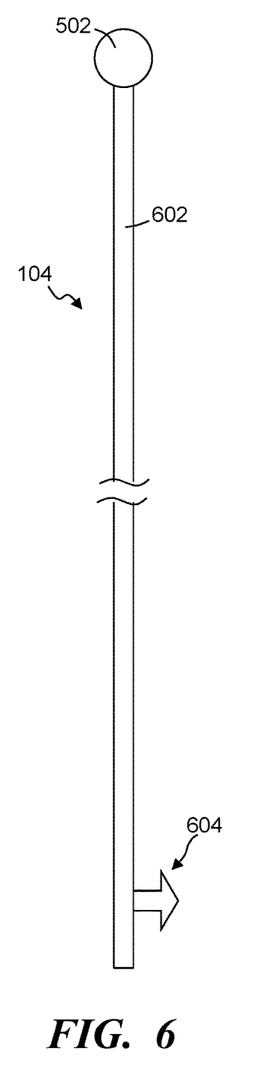
FIGS. 6-8 illustrate simplified plane views of exemplary tension supports, in accordance with some embodiments, with varying types of package couplings.

FIG. 6 illustrates a simplified plane view of an exemplary tension support 104, in accordance with some embodiments. In this example, the tension support includes the slot coupler 502, which is typically positioned proximate one end of the tension support, a body 602, and a package coupling 604 that is separated from the slot coupler by a distance along the tension support. Typically, the package coupling is secured with and/or formed on the body 602 proximate an opposite end from the slot coupler.

The body can be formed from one or more components, such as rods, cords, ropes, cables, or other such components. In some implementations the tension supports are at least partially rigid with some flexibility. For example, a flexible rod extends from the slot coupler 502 to cooperate with and extend through the tension support channel, and flex in response to the weight of the package. In some embodiments, the body is a continuous rod formed from plastic, fiber glass, carbon fiber, aluminum, other such material or combination of materials. In some implementations, the body is implemented at an elastic rod. The rod can be constructed of substantially any relevant material that provides a desired elasticity to achieve a desired bend when cooperated with the receiving slot and a predefined weight of a package is secured with a predefined number (e.g., four) of tension supports. For example, the tension support may be formed through injection modeling of plastic.

Figure 7:
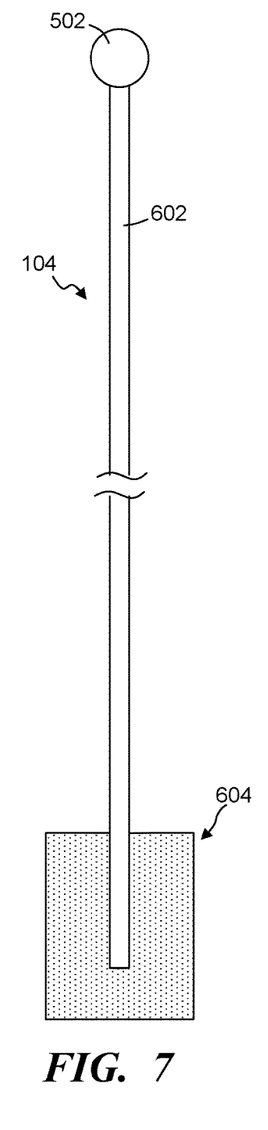
Figure 8:
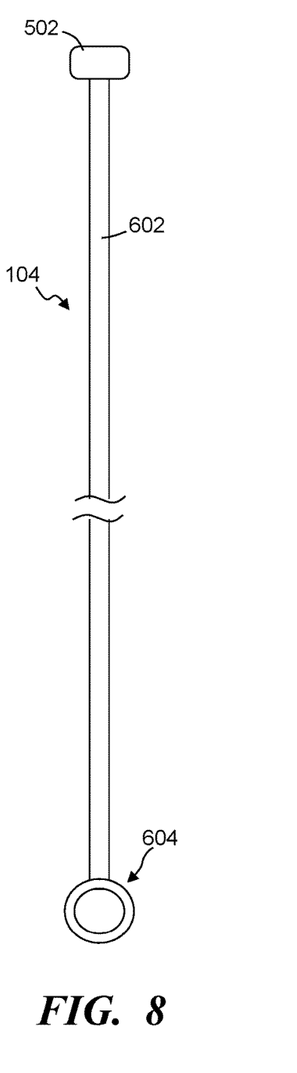

FIGS. 7-8 illustrate simplified plane views of exemplary tension supports 104, in accordance with some embodiments, with varying types of package couplings 604. The package couplings can be configured to directly secure with a package to be delivered or with an extension (e.g., tab, loop, cord, etc.) extending from the package. Further, in some instances, the package is a shipping package with the tension supports previously secured with the shipping package and ready to have a product to be shipped put into the shipping package. In other implementations, the tension support 104 can be cooperated with the package as part of preparing the package and/or product for delivery. For example, the package coupling 604 can be cooperated directly with the packaging of the product, or cooperated with a shipping package within which a product has been placed. Further, the package coupling 604 can be formed as part of the body 602, secured with the body, adhesively attached with the body, or the like. For example, the package coupling may, in some instances, be rotationally coupled through a ring or conduit with the body and resting on shoulder formed in the body allowing the package coupling swivel and/or rotate relative to the body.

Numerous different types of package couplings 604 can be implemented on a tension support, and/or a combination of two or more different package couplings may be included on a single package support. For example, the package coupling 604 may include a tapered or barbed penetration package coupling (e.g., FIG. 6), where at least a portion of the package coupling is penetrated through a portion of the packaging of the package. In some instances, the head of the penetration package coupling may flex to decrease a diameter during penetration and expand upon passing through at least a portion of the package. As another example, the package coupling 604 may be an adhesive patch, tape or the like (e.g., FIG. 7) that sticks to the package. As yet another example, the package coupling 604 may be a loop, hook, carabiner or other structure that can cooperate with the package and/or a tab, hook, loop or other structure extending off of the package (e.g., FIG. 8). Further, in some implementations, the tension support maybe configured such that a type of package coupling 604 is selected (e.g., based on a type of product, a type of packaging, size of package, weight of package, other such factors, or combination of two or more of such factors) and cooperated with a tension support (e.g., threaded onto the tension support; inserted through one of one or more insertion bores on the tension support; adhered to the tension support through an adhesive, heating, partially melting, etc.; connected to a universal coupler of the tension support; the tension support securing with a universal coupler of the package coupling; other such methods; or combination of two or more of such methods).

Again, the tension support 104, in some embodiments, is configured to elastically flex or bend while cooperated with the package release hanger 100 and in response to the weight of the package. This elastic flexing can aid the disengagement of the tension supports from the package release hanger. In some implementations, as described above, the tension support is maintained in position in part due to the downward and radial outward force the slot coupler 502 applies on the receiving slots 302 that are induced by the weight of the package. When one or both of these forces are reduced by a threshold amount, the elasticity provides a biasing force to push the slot coupler out of the corresponding receiving slot in response to the decrease of at least the threshold amount of the force. Further, the receiving slot in some applications can be formed in the upper surface 404 of the package release hanger 100. When the package release hanger is in use and supporting a package, the upper surface faces away from the package such that the slot couplers 502 when pushed by the elastic rod are forced out of the receiving slots and elastically spring away from the package. The release of the slot couplers mechanically releases the tension supports and the package from the package release hanger 100 and the unmanned delivery aircraft 202. Accordingly, the release is achieved without having to issue a communication to release the package, without an electoral signal that triggers a release or other such activation of the release by a control circuit. The release is, in some implementations, strictly mechanical. Further, the release is achieved without the delivery aircraft having to land. Instead, the delivery aircraft can hover over the delivery site at substantially any height (e.g., dependent on length of cord, wind, weight of package, etc.).

The unmanned delivery aircraft 202 can control the decent of the package by controlling a rate at which the delivery aircraft drops in elevation and/or controls the rate of a crane system or other such system in lowering the package. However, the delivery aircraft, a control circuit of the delivery aircraft, a control circuit of a crane system, a remote control system are not needed to initiate and achieve the release of the package. In some implementations, one or more sensors may be cooperated with the package release hanger, the cord 202 and/or the delivery aircraft to detect when and/or confirm that the package has been released from the package release hanger. For example, one or more weight detectors may be cooperated with the package release hanger and/or the delivery aircraft. Based on the detected weight and/or a detected change in weight, the delivery aircraft can confirm the package has been released. Further, the delivery aircraft may initiate an increase in elevation and/or initiate a retraction of the cord to further confirm the release of the package, for example, an increase in a threshold elevation and/or a retraction of a threshold length of cord confirms the package is no longer cooperated with the package release hanger. The threshold change in elevation and/or the threshold length of cord may depend, for example, on a length of one or more of the tension supports, the length, width and/or depth of the package, and other such factors, or combination of two or more of such factors.

Figure 9:
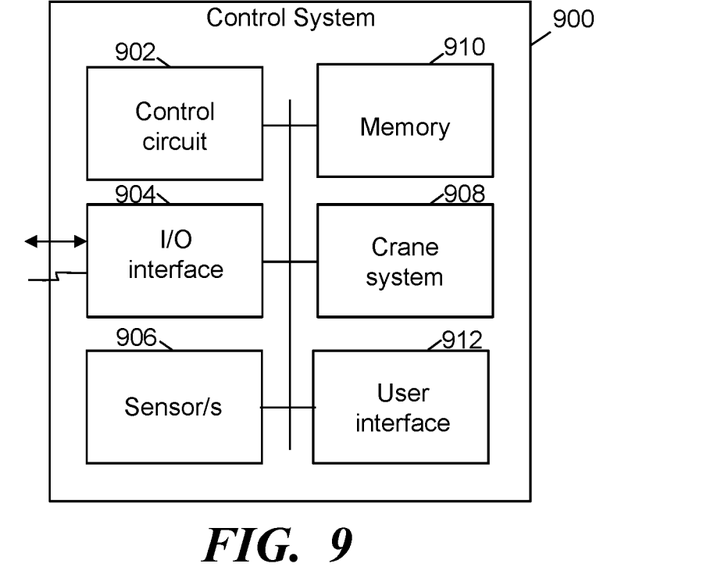
FIG. 9 illustrates an exemplary control system of unmanned delivery aircraft, in accordance with some embodiments.

FIG. 9 illustrates an exemplary control system 900 of unmanned delivery aircraft 200, in accordance with some embodiments. The delivery aircraft is presumed to itself have a control circuit 902 that provides control over the movement of the delivery aircraft and/or the crane system. Further, the control circuit can couple with an on-board transceiver 904 and/or network interface. The transceiver can provide substantially any wired and/or wireless communication depending on an intended implementation. For example, the control circuit can communicate via the transceiver with a remote delivery coordination and/or control system of a delivery vehicle that transports the delivery aircraft to a delivery area, a retail facility, a distribution center, or other such delivery coordination system, a location and/or navigation system, one or more databased, and other remote systems. In some embodiments, the delivery aircraft may include one or more on-board sensors 906 that sense one or more conditions or circumstances that the delivery aircraft and/or the control circuit 902 can employ to develop information of interest. Examples in these regards include but are not limited to cameras, video cameras, sound-based proximity sensors, light-based proximity sensors, accelerometers, gyroscopes, magnetometers, global positioning detector/receiver, beacon detectors, cord status and/or length deployed, weight sensors, and so forth. The delivery aircraft can further include a crane system 908 or other deployment system.

The control circuit 902 typically comprises one or more processors and/or microprocessors. The control circuit couples with and/or includes memory 910 that stores operational code or one or more sets of instructions that are executed by the control circuit and/or processor to implement the functionality of the delivery aircraft. In some implementations, the memory further stores code, instructions and corresponding data to allow the delivery aircraft to navigate to a desired delivery site from a deployment site, communicate with external devices, store data, and other such operations. Such data may be pre-stored in the memory or be received, for example, from an inventory systems, distribution facility system, other sources, or combinations of such sources.

In some implementations the control system 900 may include one or more user interfaces 912, and can include substantially any known input device, such one or more buttons, knobs, selectors, switches, keys, touch input surfaces, scanners, displays, etc. Additionally, the user interface may include one or more output display devices, such as lights, visual indicators, display screens, etc. to convey information to a user. While FIG. 9 illustrates the various components being coupled together via a bus, it is understood that the various components may actually be coupled to the control circuit 902 and/or one or more other components directly.

Figure 10:
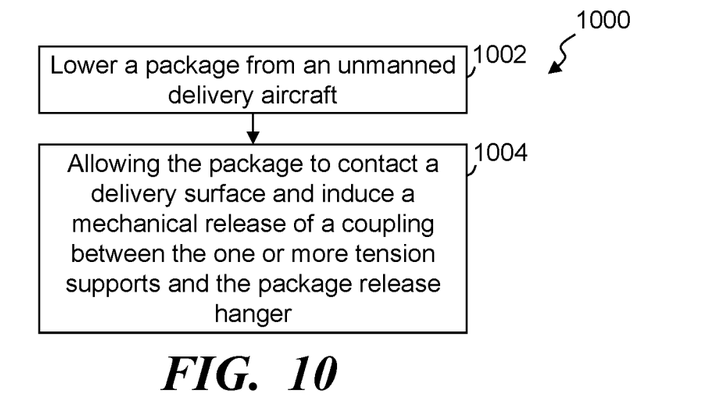
FIG. 10 illustrates a simplified flow diagram of an exemplary process of delivering a package and disengaging a package from an unmanned delivery aircraft, in accordance with some embodiments.

FIG. 10 illustrates a simplified flow diagram of an exemplary process 1000 of delivering a package 102 and disengaging a package from an unmanned delivery aircraft 200, in accordance with some embodiments. In step 1002 a package is lowered from an unmanned delivery aircraft 200 and/or the delivery aircraft descends in altitude with the package 102 secured through one or more tension supports 104 that are each releasably cooperated with a package release hanger 100 that is suspended from the unmanned delivery aircraft. In step 1004, the package allowed to contact a delivery surface causing a decrease of at least a threshold amount of a force being applied by the weight of the package on the one or more tension supports. The reduction in the force induces a mechanical release of a coupling between the one or more tension supports and the package release hanger resulting in a release of the package from the unmanned delivery aircraft.

Again, the tension supports 104 mate with receiving slots 302 of the package release hanger 100. The mating can include mating a slot coupler 502 of each of the one or more tension supports 104 with one of multiple receiving slots distributed about the package release hanger such that the force applied by the weight of the package on the one or more tension supports induces a radial outward force by the tension support that is asserted by the slot coupler on the corresponding receiving slot and maintains a positioning of the slot coupler within the receiving slot. The decrease of at least the threshold amount of the force in some implementations further causes each of the one or more tension supports to push the corresponding slot coupler at least partially radially inward and out of the corresponding receiving slot in response to the decrease of at least the threshold amount of the force to mechanically release the coupling between the package and package release hanger. The decrease of at least the threshold amount of the force can further cause each of the one or more tension supports, each comprising an elastic rod extending along at least a majority of a length of each of the one or more tension supports, to push the corresponding slot coupler out of the corresponding receiving slot in response to the decrease of at least the threshold amount of the force.

In some embodiments, the mating of the slot coupler with a receiving slot further causes the elastic rod of each of the one or more tension supports, when cooperated with a package and a receiving slot, to elastically bend in response to the force due to the weight of the package secured by the package coupling and causing the radial outward force to be asserted by the slot coupler on the corresponding receiving slot. Further, in some applications the receiving slots are formed and/or coupled to an upper surface of the package release hanger. As such, in inducing the mechanical release of the coupling between the one or more tension supports and the package release hanger includes the elastic rod of each of the one or more tension supports forcing the slot couplers out of the receiving slots to elastically spring away from the package. In some instances, the slot couplers are mated with a coupler seat of a respective one of the receiving slot such that the slot coupler applies the radially outward force on the coupler seat, and allowing slot coupler to swivel within the coupler seat. Still further, the mating the slot coupler with a receiving slot and include positioning a portion of a respective one of the one or more tension supports within a tension support channel extending from a corresponding receiving slot toward a peripheral edge of the package release hanger while the slot coupler is maintained within the receiving slot.

In some embodiments, systems, apparatuses and methods are provided to enhance delivery of packages and/or cargo through the use of unmanned delivery aircraft. In some embodiments, a mechanical package release system is provided that comprises: a package release hanger configured to couple with and suspend from an unmanned delivery aircraft; and one or more tension supports each configured to secure with a package and to releasably couple with the package release hanger wherein a decrease of at least a threshold amount of a force being applied by the weight of the package on the one or more tension supports induces a mechanical release of the coupling between the one or more tension supports and the package release hanger resulting in a release of the package from the unmanned delivery aircraft.

Some embodiments provide methods of delivering packages. One or more of these methods comprises: lowering a package from an unmanned delivery aircraft, wherein the package is secured through one or more tension supports that are each releasably cooperated with a package release hanger that is suspended from the unmanned delivery aircraft; and allowing the package to contact a delivery surface causing a decrease of at least a threshold amount of a force being applied by the weight of the package on the one or more tension supports, and inducing a mechanical release of a coupling between the one or more tension supports and the package release hanger resulting in a release of the package from the unmanned delivery aircraft.

The package and/or cargo can be substantially any package, size, shape, and/or weight that can be lifted, and carried an intended distance by an intended unmanned delivery aircraft. In other implementations, the package release hanger and cooperated tension supports 104 can be utilized with other delivery vehicles and aircraft. For example, one or more large scale package release hangers can be utilized with helicopters in delivering larger payloads of one or more packages and/or cargo that can weigh hundreds of pounds or more.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:
1. A mechanical package release system, comprising:
a package release hanger configured to couple with and suspend from an unmanned delivery aircraft; and
one or more tension supports each configured to secure with a package and to releasably couple with the package release hanger wherein a decrease of at least a threshold amount of a force being applied by the weight of the package on the one or more tension supports induces a mechanical release of the coupling between the one or more tension supports and the package release hanger resulting in a release of the package from the unmanned delivery aircraft;
the package release hanger comprising multiple receiving slots distributed about the package release hanger and a suspension link configured to secure the package release hanger with the unmanned delivery aircraft; and
each of the one or more tension supports comprises a package coupling configured to secure the respective tension support with the package, and a slot coupler separated from the package coupling by a distance along the respective tension support and configured to mate with one of the receiving slots such that the force applied by the weight of the package on the one or more tension supports induces a radial outward force by the respective tension support that is asserted by the slot coupler on the corresponding receiving slot and maintains a positioning of the slot coupler within the receiving slot.

2. The package release system of claim 1, wherein each of the one or more tension supports is configured to push the corresponding slot coupler at least partially radially inward and out of the corresponding receiving slot in response to the decrease of at least the threshold amount of the force to mechanically release the coupling between the package and package release hanger.

3. The package release system of claim 1, wherein each of the one or more tension supports comprises an elastic rod extending along at least a majority of a length of each of the one or more tension supports and configured to push the corresponding slot coupler out of the corresponding receiving slot in response to the decrease of at least the threshold amount of the force.

4. The package release system of claim 3, wherein the elastic rod of each of the one or more tension supports, when cooperated with the package and the corresponding receiving slot, elastically bends in response to the force due to the weight of the package secured by the respective package coupling causing the radial outward force to be asserted by the slot coupler on the corresponding receiving slot.

5. The package release system of claim 4, wherein the corresponding receiving slot is formed in a first surface of the package release hanger that is positioned, when in use to support the package, facing away from the package such that the slot couplers when pushed are forced out of the receiving slots and elastically spring away from the package.

6. The package release system of claim 1, wherein each of the receiving slots comprise a coupler seat in which the slot coupler is positioned and upon which the slot coupler applies the radially outward force, wherein the cooperation between the slot coupler and the coupler seat allows the slot coupler to swivel within the coupler seat.

7. The package release system of claim 1, wherein the package release hanger further comprises multiple tension support channels, wherein each tension support channel cooperates with one of the multiple receiving slots and extends from the corresponding receiving slot at an angle relative to a central axis of the package release hanger and toward a peripheral edge of the package release hanger, wherein a portion of a respective one of the one or more tension supports is positioned within the tension support channel while the slot coupler is maintained within the corresponding receiving slot.

8. A method of delivering a package, comprising:
lowering a package from an unmanned delivery aircraft, wherein the package is secured through one or more tension supports that are each releasably cooperated with a package release hanger that is suspended from the unmanned delivery aircraft;
allowing the package to contact a delivery surface causing a decrease of at least a threshold amount of a force being applied by the weight of the package on the one or more tension supports, and inducing a mechanical release of a coupling between the one or more tension supports and the package release hanger resulting in a release of the package from the unmanned delivery aircraft; and
mating a slot coupler of each of the one or more tension supports with one of multiple receiving slots distributed about the package release hanger such that the force applied by the weight of the package on the one or more tension supports induces a radial outward force by the tension support that is asserted by the slot coupler on the corresponding receiving slot and maintains a positioning of the slot coupler within the receiving slot.

9. The method claim 8, wherein the allowing the package to contact the delivery surface causing the decrease of at least the threshold amount of the force further causes each of the one or more tension supports to push the corresponding slot coupler at least partially radially inward and out of the corresponding receiving slot in response to the decrease of at least the threshold amount of the force to mechanically release the coupling between the package and package release hanger.

10. The method of claim 8, wherein the allowing the package to contact the delivery surface causing the decrease of at least the threshold amount of the force further causing each of the one or more tension supports, each comprising an elastic rod extending along at least a majority of a length of each of the one or more tension supports, to push the corresponding slot coupler out of the corresponding receiving slot in response to the decrease of at least the threshold amount of the force.

11. The method of claim 8, wherein the mating the slot coupler of each of the one or more tension supports with one of multiple receiving slots further comprises causing the elastic rod of each of the one or more tension supports, when cooperated with the package and the corresponding receiving slot, to elastically bend in response to the force due to the weight of the package secured by the respective package coupling and causing the radial outward force to be asserted by the slot coupler on the corresponding receiving slot.

12. The method of claim 11, wherein the inducing the mechanical release of the coupling between the one or more tension supports and the package release hanger further comprises the elastic rod of each of the one or more tension supports force the slot couplers out of the receiving slots to elastically spring away from the package.

13. The method of claim 8, wherein the mating the slot coupler of each of the one or more tension supports with one of multiple receiving slots further comprises mating each of the slot couplers of the one or more tension supports with a coupler seat of a respective one of the receiving slot such that the slot coupler applies the radially outward force on the coupler seat, and allowing slot coupler to swivel within the coupler seat.

14. The method claim 8, wherein the mating the slot coupler of each of the one or more tension supports with one of multiple receiving slots further comprises positioning a portion of a respective one of the one or more tension supports within a tension support channel extending from a corresponding receiving slot toward a peripheral edge of the package release hanger while the slot coupler is maintained within the receiving slot.

* * * * *

UNITED STATES PATENT AND TRADEMARK OFFICE
CERTIFICATE OF CORRECTION

PATENT NO. : 10,301,021 B2  
APPLICATION NO. : 15/271801  
DATED : May 28, 2019  
INVENTOR(S) : Nathan G. Jones et al.

Page 1 of 1

It is certified that error appears in the above-identified patent and that said Letters Patent is hereby corrected as shown below:

In the Claims

Column 12, Line 10, Claim 9, insert --of-- after "method".
Column 12, Line 29, Claim 11, insert --of-- after "method".
Column 12, Line 53, Claim 14, insert --of-- after "method".

Signed and Sealed this
Twenty-fourth Day of September, 2019

Andrei Iancu
*Director of the United States Patent and Trademark Office*